June 29, 1965 P. I. PRENTKY ETAL 3,192,477

GATED VARIABLE FREQUENCY OSCILLATOR

Filed Jan. 13, 1961 2 Sheets-Sheet 1

INVENTORS
PETER I. PRENTKY
HAROLD ZIBKOFF

BY

ATTORNEY

June 29, 1965 P. I. PRENTKY ETAL 3,192,477

GATED VARIABLE FREQUENCY OSCILLATOR

Filed Jan. 13, 1961 2 Sheets-Sheet 2

3,192,477

GATED VARIABLE FREQUENCY OSCILLATOR

Peter I. Prentky, Wappingers Falls, and Harold Zibkoff, Brooklyn, N.Y., assignors to International Business Machines Corporation, New York, N.Y., a corporation of New York Filed Jan. 13, 1961, Ser. No. 82,478
4 Claims. (Cl. 328—39)

This invention relates to improvements in variable frequency clocks such as those used, for example, in the gating and transmission of data in electronic data processing systems.

The invention has special application to variable frequency clocks used in electronic data processing systems for gating data from magnetic tape into the processing system.

Improved data handling techniques have made it possible to read magnetic tape records at high speed, notwithstanding the fact that the density of such records may exceed 3000 bits per inch of tape track.

Characters recorded on magnetic tape are ordinarily represented in the binary notation wherein each character is represented by a combination of 1 to 0 bits. When the bits of a character are read from tape they are transmitted to a character register from which they are simultaneously gated into the data processing system by means of a gating pulse whose frequency is equal to the repetition rate of characters read from the tape. When the density of magnetic tape records is not great, no significant record gating problems are encountered. However, in systems adapted to the processing of records having a density sometimes in excess of 3000 bits per inch of tape track, difficult record gating problems are encountered. In order to insure that all of the bits of a character, and only the bits comprising a single character, are transmitted into the data processing system at each character cycle, use has been made of multi-character registers for receiving the tape recordings. A register system of this type is disclosed in United States Patent 2,921,296, granted January 12, 1960, on the application of Theodore G. Floros. Data can be gated through character registers such as those in the Floros patent by means of a timing device which produces gating pulses at a fixed frequency which matches the nominal rate at which characters are sensed on the tape provided the tape recorded records are at relatively low density. Any attempt to gate the characters of a dense record under control of a pulse appearing at a fixed frequency meets with the difficulty that even slight differences in the speed at which the tape is driven past the tape reading head will render the gating pulse frequency and the character repetition rate so non-synchronous as to make a constant frequency device unsuited for the purpose.

It has been proposed, therefore, to provide a variable frequency clock for producing timing pulses which vary according to variations in the rate at which characters are read from the tape, as indicated in said Floros patent. A clock designed for this purpose is disclosed in the application for United States Letters Patent, Serial No. 745,731, filed by Ernest G. Newman on June 30, 1958. In said Newman application, as in this application, the frequency of an oscillator is controlled by variations in its input voltage derived as a function of the tape character repetition rate. The oscillator output pulses initiate a saw-tooth wave which is compared with the arrival of the pulses coming from the tape. When the oscillator output is synchronized with the arrival of characters read from the tape, each 1 pulse from the tape will fall into the center of the saw-tooth wave. If the 1 pulses from the tape begin to appear before the center of the saw-tooth wave, it is an indication that the pulses are coming earlier, i.e., the tape speed is increased from its nominal speed. Under these conditions, frequency control voltage applied to the oscillator is made more negative such that its output frequency is increased to match the increased character repetition rate. Conversely, if the 1 pulses appear after the center of the saw-tooth wave, it is an indication that the pulses are coming later, i.e., that the tape speed has decreased. Under these conditions, the frequency control voltage applied to the oscillator is made more positive such that its output frequency is decreased to match the decreased character repetition rate.

Heretofore, some difficulty has been encountered in initially locking the variable frequency oscillator to the repetition rate at the beginning of a tape recorded record. In one embodiment a burst of 15 or 16 synchronizing pulses are recorded in each track of the tape at the beginning of each record. The reading of 6 or 8 of the burst pulses were relied on to insure synchronization of clock frequency with the repetition rate of the burst pulses. To provide for the possibility of a record having a long succession of 0's which might allow a drift in the frequency of the clock, a clock synchronizing bit is also recorded in each of the tracks of the tape at regular intervals among the bits of a record, e.g., after each five bits. The clock is thereby synchronized to the tape bit repetition rate by the synchronizing burst and is maintained in synchronization by the reading of subsequent 1's whether such 1's are part of a character or one of the intermittent synchronizing bits.

It is the primary purpose of this invention to provide a variable frequency clock which will respond quickly to the influence of synchronizing pulses and which will provide a more positive lock-in with such pulses.

It is a further object of the invention to provide an improved variable frequency oscillator and a control circuit therefor, especially useful in variable frequency clocks for high speed electronic data processing systems.

These and further objects and advantages of the invention will appear as the following description of the same is developed in light of the drawings forming a part thereof. In those drawings, like reference numerals indicate like parts, and:

Figure 1:
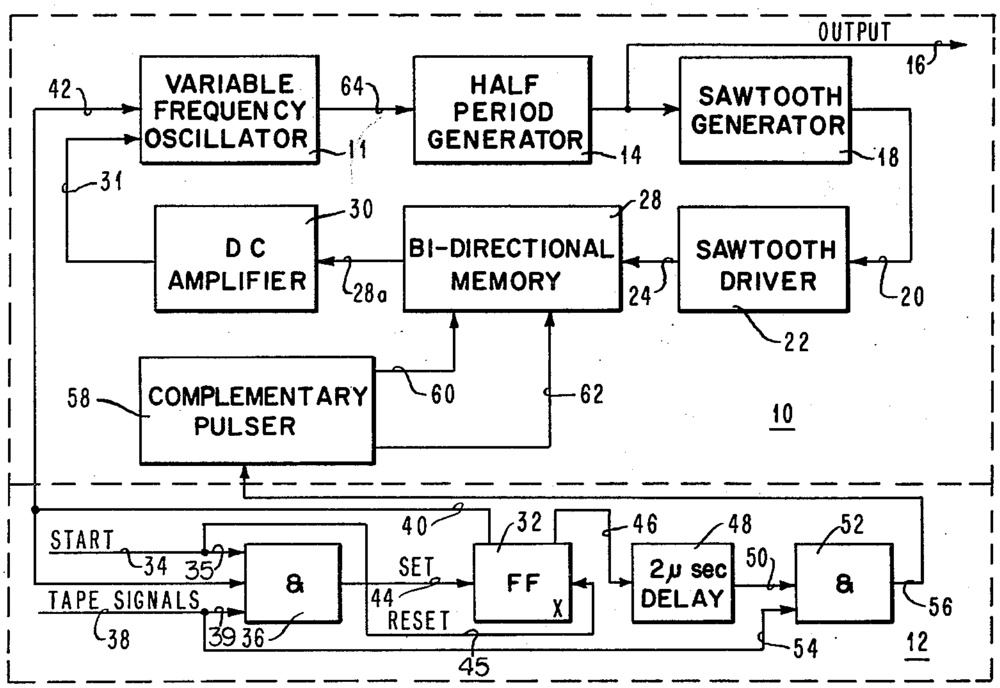
FIG. 1 is a block diagram of a variable frequency clock and its control system.

In FIG. 1 the variable frequency clock 10 is under control of a starting and synchronizing circuit 12. The clock 10 includes as its primary component a variable frequency oscillator 11 whose details are disclosed in FIG. 2. The output of the variable frequency oscillator 11 is a sine wave which is fed to a half-period generator 14 which is in the nature of pulse former and wherein half-period pulses are generated at the time the sine wave passes through its zero amplitude from its minus voltage value to its plus. The output of the half-period generator on a line 16 is, therefore, a series of pulses having a frequency dependent on the frequency of the oscillator 11. These pulses are usefully employed as control pulses in an electronic processing system or the like, as for example, character gating pulses as described above.

Figure 3:
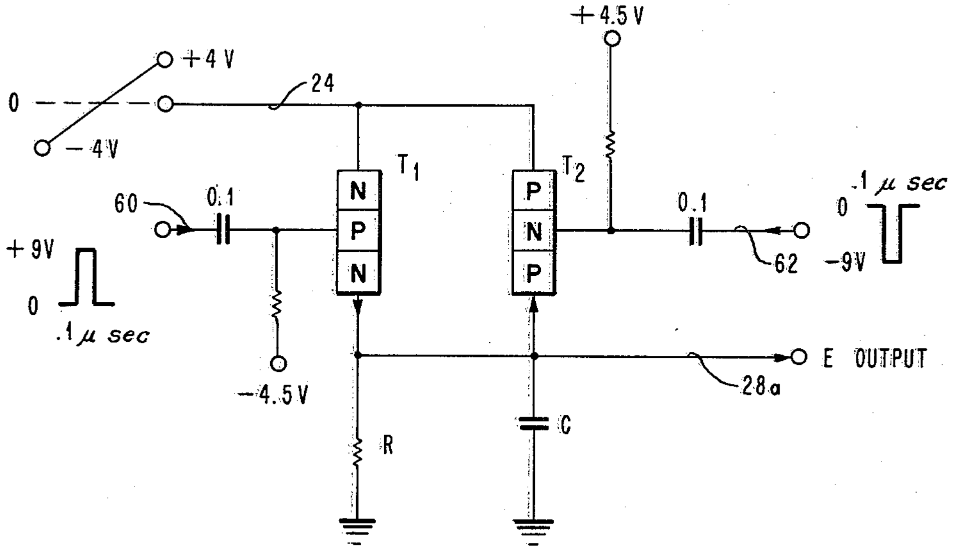
FIG. 3 is a diagram of a bi-directional memory and gate which is a part of the system.
Figure 4:
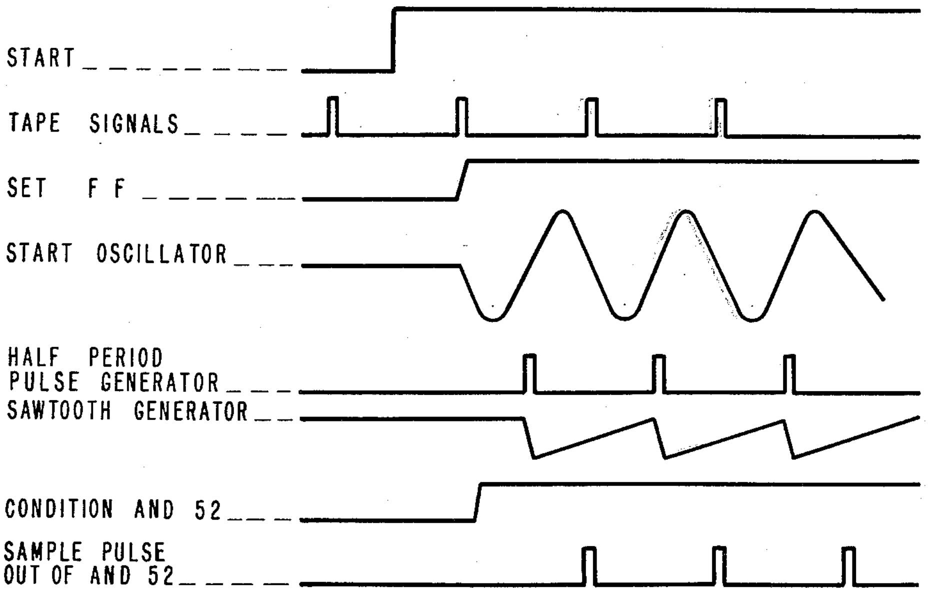
FIG. 4 is a timing diagram showing the relationship of various circuit functions.

The half-period pulses from the half-period generator 14 are also fed into a saw-tooth generator 18 which will start at nominal frequency at the beginning of a synchronizing burst. The saw-tooth wave form on line 20 is fed into a saw-tooth driver 22 which lowers the impedance of the saw-tooth generator output and delivers it by way of a connection 24 to a bi-directional memory 28 in which the arrival of tape pulses are compared to the saw-tooth wave. The details of the bi-directional memory are shown in FIG. 3. A resultant voltage proportional to the position of the tape pulse along the saw-tooth wave is passed through an amplifier 30 and is delivered on line 31 as a frequency control voltage to the variable frequency oscillator 11.

The components of the transistorized variable frequency clock 10 find their functional counterpart in the aforesaid Newman patent application, wherein the logic is implemented by vacuum tube technology.

The variable frequency oscillator start circuit 12 with which this application is primarily concerned is designed to start the variable frequency oscillator 11 with the first pulse of the synchronizing burst above described. Essentially, the system involves the concept of making the state of the oscillator dependent on the D.C. level of a flip-flop 32. The flip-flop 32 is a well known bistable element capable of producing a high output potential on one of its two outputs and a low output potential on the other of its outputs, and vice versa, as conduction is switched from one side to the other. The flip-flop 32 is controlled by a start signal on an input line 34 and by the output of an AND circuit 36. The start signal is a steady state signal which is present whenever the system is conditioned to process a record. It is brought up at the beginning of a record and it falls approximately 10 microseconds after the record has been read. The potential on the start line 34 is connected to the reset side of the flip-flop 32 via a connection 45 to reset it at the end of the record.

The start signal on line 34 is also the input to the AND circuit 36 which has an output connection 35. The AND circuit is a well known component which produces an output whenever all of its inputs are energized. The AND circuit 36 also has as an input thereto the tape signals on line 38 which are transmitted thereto via an input connection 39. The tape signals appear as pulses whenever 1's are read from tape. A third input to the AND circuit 36 is the output from the left side of the flip-flop 32 on line 40.

When the start signal appears on line 34, it not only conditions the first input of the AND circuit 36 but it also unclamps the flip-flop 32, rendering it capable of being set by the output of the AND circuit 36. The potential on the line 40 is high when the flip-flop 32 is in the reset state. Hence this input of the AND circuit 36 is also conditioned before tape signals are sensed. The first tape signal that arrives after the start line 34 is up, passes through the AND circuit 36 and sets the flip-flop 32.

When the flip-flop 32 is conducting on its left side, as it is in its set condition, the potential on the left output of the flip-flop 32 will drop and it will decondition one of the inputs to the AND circuit 36 such that no subsequent tape signal on line 38 can pass therethrough until its conditioning potentials on lines 34 and 40 are again simultaneously present. Furthermore, as the potential on the flip-flop output line 40 drops, the drop is sensed by the variable frequency oscillator 11 and the oscillator is thus started into operation as to be explained more fully hereinbelow.

The potential on the right output 46 of the flip-flop 32 is delivered to a 0.2 microsecond delay unit 48 whose output 50 is an input to a second AND circuit 52. The other input to the AND circuit 52 are the tape signals on the input line 38 which are transmitted to the AND circuit 52 by way of a connection 54. It is intended, therefore, that each of the tape signals on input line 38 be also impressed on the AND circuit 52. However, these signals do not pass through the AND circuit 52 until the latter has been conditioned by a potential on its other input line 50. In this regard, it should be noted that the 0.2 microsecond delay unit 48 serves to delay the first tape signal which effectively started the variable frequency oscillator 11 such that the first tape signal cannot pass through the AND circuit 52 and thereby cause an erroneous output signal. By the time the second tape signal appears on line 54, the AND circuit 52 will have been conditioned by a potential on its input 50 and subsequent tape signals will, therefore, freely pass through the AND circuit 52 and will be transmitted via a line 56 to a complementary pulser 58 which is a device in which an input pulse on line 56 is resolved into oppositely phased complementary pulses on output lines 60 and 62. Complementary pulsers, such as contemplated by the element 58, are disclosed among the transistor switching circuits shown in the application for United States Letters Patent, Serial No. 622,307, filed November 15, 1956, by Hannon S. Yourke.

As the tape signals pass along line 54 and through the AND circuit 52 during the reading of a record and are transmitted to the complementary pulser 58, the outputs of the complementary pulser are transmitted to the bi-directional memory 28, the configuration of which is as shown in FIG. 3 and which is more fully described in the concurrent United States patent application of Ambrose A. Verdibello.

As stated, the tape signals are compared to the saw-tooth wave form in the bi-directional memory 28, and the signal voltage which is generated is then transmitted via the amplifier 30 to control the rate of the variable frequency oscillator 11.

Figure 2:
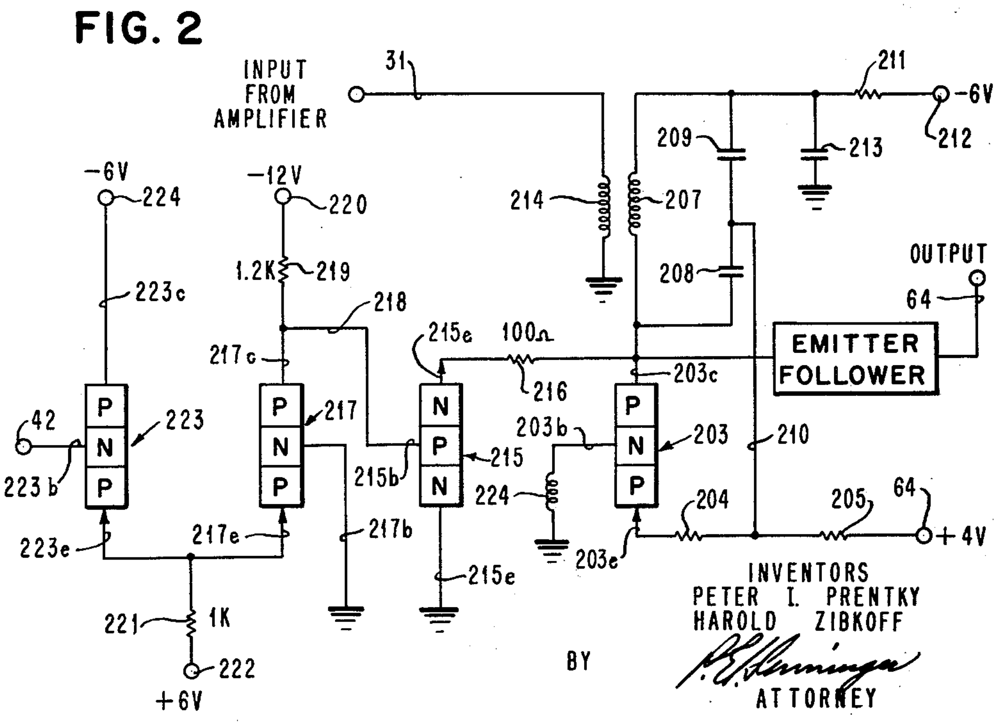
FIG. 2 is a diagram of an improved variable frequency oscillator and a control circuit therefor.

The oscillator 11, FIG. 2, includes a PNP transistor 203 having an emitter electrode 203*e*, a base electrode 203*b* and a collector electrode 203*c*. The emitter 203*e* is connected through two voltage divider resistors 204, 205 to a +4 v. source 64. The collector 203*c* is connected to one terminal of a tank circuit which includes an inductance coil 207 connected in parallel with two series-connected capacitors 208 and 209. The common junction of the capacitors 208 and 209 is connected through a wire 210 to the common junction of the resistors 204 and 205. The terminal of the tank circuit opposite the collector 203*c* is connected through a resistor 211 to the terminal 212 of a source of potential, whose value may be, by way of example, −6 volts. A capacitor 213 is connected between the terminal of the resistor 211 opposite the terminal 212 and ground. The base electrode is connected to ground through a small inductor 224.

The frequency of oscillation of the oscillator 11 may be varied by changing the current through a secondary coil 214 which is magnetically coupled to the oscillator tank coil 207, thereby changing the effective inductance in the tank circuit and hence the frequency of oscillation of the tank circuit. The current through the secondary coil 214 is the output of the D.C. amplifier 30 on the input line 31. The oscillator start circuit consists of an NPN transistor 215 having an emitter 215*e*, a base 215*b*, and a collector 215*c*. The collector 215*c* is connected to ground. The emitter 215*e* is connected through a resistor 216 to the collector 203*c* of the transistor 203.

The transistor 215 serves as the third stage of a three-stage amplifier responsive to the potential at the input terminal 42.

The second stage of the amplifier includes a PNP transistor 217 having an emitter 217*e*, a base 217*b* and a collector 217*c*. The collector 217*c* is connected directly through a wire 218 to the base 215*b* of the transistor 215. The collector 217*c* is also connected through a load resistor 219 to a terminal 220 of a source of electrical energy which may have a potential of −12 volts. The base 217*b* is grounded. The emitter 217*e* is connected through a resistor 221 to a terminal 222 of a source of electrical energy which may, for example, have a potential of +6 volts.

The first stage of the amplifier includes a PNP transistor 223 having an emitter 223*e*, a base 223*b*, and a collector 223*c*. The collector 223*c* is connected directly to a terminal 224 of a source of electrical energy which may have a potential of −6 volts. The emitter 223e is connected directly to the emitter 217e. The base 223b is connected directly to the input terminal 42.

At the start of a burst of pulses being read, a negative potential is applied to the input terminal 42. This biases the emitter-base junction of the transistor 223 strongly forwardly, increasing the current flow through the resistor 221, and swinging the emitters 223e and 217e in a negative sense. The current flow through the transistor 217 and the resistor 219 is decreased, allowing the collector 217c to swing toward a potential of −12 volts. This cuts off the transistor 215, removing the load from the oscillator, which starts oscillating quickly due to the energy stored in the coil 207.

The bi-directional memory 28 as shown in FIG. 3 provides positive or negative signals from which the oscillator 11 is controlled. It also retains memory of the signal in case there is a long interval between 1's being read from the tape. The bi-directional memory has an output 28a which follows the input phase on inputs 60 and 62 in both the positive and negative direction. The circuit is designed to gate the saw-tooth wave from the saw-tooth driver 22 and the tape pulse wave forms together such that the signal level presented to the memory element is determined by the level of the saw-tooth wave at the time of tape pulse coincidence. Finally, in the absence of input pulses, the memory output always restores to ground or zero level from either positive or negative direction.

Initially, the NPN transistor T1 and the PNP transistor T2 are normally off. The positive and negative pulses at the bases of the transistors T1 and T2 are equal in magnitude but opposite in polarity and they occur at precisely the same time. If the level of the coincidence of the saw-tooth wave form as impressed on the collectors of the transistors is between zero and −4 volts, the transistor T1 becomes inoperative while the transistor T2 delivers the negative charge current. If coincidence occurs between the zero and the +4 volts portion of the saw-tooth wave form, the transistor T2 becomes inoperative, while the transistor T1 delivers the positive charge current. The level of the charge is limited by the collector potential at coincidence. When the coincident pulse is removed, the memory element which is the capacitor c discharges toward ground through a very large time constant.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a control circuit for a variable frequency oscillator responsive to magnetic tape signals, an oscillator which is held in its off condition by the application of a positive potential thereto, a bistable element, a connection between said oscillator and said bistable element for delivering a control potential from the latter to the former, a terminal for receiving a steady signal during the reading of magnetic tape record, a connection between said terminal and said bistable element whereby said bistable element is switched to deliver a positive potential to said oscillator, a coincidence circuit, an input connection between said terminal and said coincidence circuit, a second terminal for receiving magnetic tape generated signals, an input connection between said second terminal and said coincidence circuit, a connection between said coincidence circuit and said bistable element whereby said bistable element is switched to deliver a negative potential to said oscillator upon coincidence of signals on said input connections of said coincidence circuit, an input connection from said bistable element to said coincidence circuit whereby said coincidence circuit is deconditioned when its output switches said bistable element, a second coincidence circuit, a connection between said bistable element and said second coincidence circuit for delivering a conditioning potential to said second coincidence circuit when said bistable element is switched by the output of said first coincidence circuit, an input connection between said second coincidence circuit and said second terminal, and an output connection between said second coincidence circuit and an element of said control circuit.

2. In a control circuit for a variable frequency oscillator responsive to magnetic tape signals, an oscillator which is held in its off condition by the application of a positive potential thereto, a bistable element, a connection between said oscillator and said bistable element for delivering a control potential from the latter to the former, a terminal for receiving a steady signal during the reading of magnetic tape record, a connection between said terminal and said bistable element whereby said bistable element is switched to deliver a positive potential to said oscillator, a coincidence circuit, an input connection between said terminal and said coincidence circuit, a second terminal for receiving magnetic tape generated signals, an input connection between said second terminal and said coincidence circuit, a connection between said coincidence circuit and said bistable element whereby said bistable element is switched to deliver a negative potential to said oscillator upon coincidence of signals on said input connections of said coincidence circuit, a second coincidence circuit, a connection between said bistable element and said second coincidence circuit for delivering a conditioning potential to said second coincidence circuit when said bistable element is switched by the output of said first coincidence circuit, an input connection between said second coincidence circuit and said second terminal, an output connection between said second coincidence circuit and an element of said control circuit, and a delay device in said connection between said bistable element and said second coincidence circuit whereby the conditioning potential on said connection is retarded.

3. In a control circuit for a variable frequency oscillator responsive to magnetic tape signals, an oscillator which is held in its off condition by the application of a positive potential thereto, a bistable element, a connection between said oscillator and said bistable element for delivering a control potential from the latter to the former, a terminal for receiving a steady signal during the reading of magnetic tape record, a connection between said terminal and said bistable element whereby said bistable element is switched to deliver a positive potential to said oscillator, a coincidence circuit, an input connection between said terminal and said coincidence circuit, a second terminal for receiving magnetic tape generated signals, an input connection between said second terminal and said coincidence circuit, a connection between said coincidence circuit and said bistable element whereby said bistable element is switched to deliver a negative potential to said oscillator upon coincidence of signals on said input connections of said coincidence circuit, a second coincidence circuit, a connection between said bistable element and said second coincidence circuit for delivering a conditioning potential to said second coincidence circuit when said bistable element is switched by the output of said first coincidence circuit, an input connection between said second coincidence circuit and said second terminal, and an output connection between said second coincidence circuit and an element of said control circuit.

4. In a control circuit for a variable frequency oscillator responsive to magnetic tape signals, an oscillator which is held in its off condition by the application of a positive potential thereto, a bistable element, a connection between said oscillator and said bistable element for delivering a control potential from the latter to the former, a terminal for receiving a steady signal during the reading of magnetic tape record, a connection between said terminal and said bistable element whereby said bistable element is switched to deliver a positive potential to said oscillator, a coincidence circuit, an input connection between said terminal and said coincidence circuit, a second terminal for receiving magnetic tape generated signals, an input connection between said second terminal and said coincidence circuit, a connection between said coincidence circuit and said bistable element whereby said bistable element is switched to deliver a negative potential to said oscillator upon coincidence of signals on said input connections of said coincidence circuit, an input connection from said bistable element to said coincidence circuit whereby said coincidence circuit is deconditioned when its output switches said bistable element, a second coincidence circuit, a connection between said bistable element and said second coincidence circuit for delivering a conditioning potential to said second coincidence circuit when said bistable element is switched by the output of said first coincidence circuit, an input connection between said second coincidence circuit and said second terminal, an output connection between said second coincidence circuit and an element of said control circuit, and a delay device in said connection between said bistable element and said second coincidence circuit whereby the conditioning potential on said connection is retarded.

References Cited by the Examiner

UNITED STATES PATENTS

| | | | |
|---|---|---|---|
| 2,554,308 | 5/51 | Miller | 331—54 |
| 2,880,317 | 3/59 | Vaughan | 328—195 |
| 2,892,933 | 6/59 | Shaw | 328—50 |
| 3,001,140 | 9/61 | Beck | 328—195 |

JOHN W. HUCKERT, *Primary Examiner.*